(12) United States Patent
Park et al.

(10) Patent No.: US 6,472,096 B2
(45) Date of Patent: *Oct. 29, 2002

(54) SECONDARY BATTERY

(75) Inventors: Un-Sick Park, Seoul; Young-Bae Song, Kyonggi-do, both of (KR)

(73) Assignee: Samsung SDI Co., Ltd., Youngin (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,391

(22) PCT Filed: Apr. 6, 1998

(86) PCT No.: PCT/KR98/00082

§ 371 (c)(1),
(2), (4) Date: Jun. 1, 1999

(87) PCT Pub. No.: WO99/27591

PCT Pub. Date: Jun. 3, 1999

(65) Prior Publication Data

US 2002/0006542 A1 Jan. 17, 2002

(30) Foreign Application Priority Data

Nov. 24, 1997 (KR) .............................................. 97-62414

(51) Int. Cl.$^7$ ........................... H01M 2/36; H01M 2/12; H01M 2/02; H01M 2/08
(52) U.S. Cl. ............................. 429/73; 429/56; 429/89; 429/176; 429/185
(58) Field of Search ............................. 429/49, 51, 56, 429/73, 74, 89, 163, 175, 185, 176

(56) References Cited

U.S. PATENT DOCUMENTS

| | | | |
|---|---|---|---|
| 3,945,846 A | | 3/1976 | Dey |
| 4,397,919 A | * | 8/1983 | Ballard ........................ 429/53 |
| 4,722,874 A | * | 2/1988 | Marchak ...................... 429/56 |
| 5,693,430 A | * | 12/1997 | Iwatsu et al. ................. 429/72 |
| 5,958,617 A | * | 9/1999 | Kozuki et al. ................ 429/53 |
| 5,968,684 A | * | 10/1999 | Hayashi et al. ............. 429/223 |
| 6,045,944 A | * | 4/2000 | Okada et al. ................ 429/163 |

FOREIGN PATENT DOCUMENTS

JP          09-92242          4/1997

OTHER PUBLICATIONS

PCT Notification of Transmittal of the International Search Report Or the Declaration (PCT/ISA/220) for International Application No. PCT/KR98/00082, Oct. 20, 1998 (5 pages).

* cited by examiner

Primary Examiner—Carol Chaney
Assistant Examiner—Tracy Dove
(74) Attorney, Agent, or Firm—Robert E. Bushnell, Esq.

(57) ABSTRACT

A secondary battery includes a can into which an electrode assembly is inserted, a cap assembly mounted to an opening of the can; and an electrolyte injection hole formed on at least one of the can and cap assembly, and safety member to close the electrolyte injection hole. The electrolyte injection hole is formed on a negative portion of the cap assembly. The safety member is inserted into and welded on the electrolyte injection hole.

11 Claims, 4 Drawing Sheets

SECONDARY BATTERY

TECHNICAL FIELD

The present invention relates to a secondary battery and, more particularly, a safety system of a secondary battery which can reduce internal pressure thereof to prevent the explosion of the secondary battery.

BACKGROUND ART

Generally, a secondary battery is a rechargeable battery such as a nickel-metal hydride battery, a lithium battery or a lithium-ion battery which is widely used in many applications. Such a secondary battery is subject to high internal pressures due to gases generated by chemical reactions when it is discharged and recharged. Though not common, it is possible for the battery to explode as a result of the gases produced.

Therefore, many presently known secondary batteries have a cap assembly provided with a safety valve which can discharge gases through a discharge hole formed on a cap cover so as to reduce the pressure in the batteries when the pressure in the battery is excessively raised.

The lithium-ion battery comprises an electrode assembly inserted into a cap. A cap assembly is mounted on an upper end of the can. Electrolyte is injected into the can through an inlet port formed on the cap assembly. Insulating members are disposed between the electrode assembly and the can.

Referring to FIG. 3, there is shown a conventional cap assembly 2. The cap assembly 2 comprises a negative portion 4 welded on an upper end of the can, a positive portion 6 disposed on a central portion of the negative portion 4, and an insulating plate 8 disposed between the negative portion 4 and positive portion 6. A rivet 10 penetrates through the negative potion 4 and positive portion 6 is coupled to the positive electrode of the roll electrode assembly.

In the above described conventional lithium-ion battery, if the pressure within the battery is abruptly increased by the gas generated therein, the battery may explode. Thus, there is provided gas release means in the secondary battery.

That is, safety grooves 12 are formed in the negative portion 4 of the cap assembly 2 through a mechanical process, etching or electroforming process. The safety grooves 12 are broken open when the internal pressure of the battery is increased above a predetermined level, thereby preventing the battery from exploding.

An electrolyte injection hole 14 is formed on the negative portion 4 of the cap assembly 2. After the electrolyte is injected through the hole 14, a plug 16 is snugly fitted into the hole 14 and is then welded to provide a seal.

FIG. 4 shows another example of a conventional cap assembly 2.

In this example, a ball(not shown) is inserted into the injection hole 14 and is then welded to provide a seal.

In the above described conventional cap assembly shown in FIGS. 3 and 4, since the safety grooves and the electrolyte injection hole are formed on the negative portion which is small in size, it is difficult to design and manufacture the same.

In the conventional cap assembly shown in FIG. 4, since the diameter of the injection hole is small, it is difficult to inject electrolyte into the can.

DISCLOSURE OF INVENTION

Therefore, the present invention has been made in an effort to solve the above described drawbacks of the prior art.

It is an object of the present invention to provide a cap assembly for a secondary battery, in which safety means can precisely operate at a pre-set pressure to prevent the battery from exploding.

It is another object of the present invention to provide a cap assembly in which the safety means can be easily formed, thereby reducing manufacturing costs.

To achieve the above objects, the present invention provide a secondary battery comprising a can into which an electrode assembly is inserted; a cap assembly mounted to an opening of the can; and an electrolyte injection hole formed on at least one of the can and cap; and a safety member mounted to tightly close the electrolyte injection hole.

Preferably, the electrolyte injection hole is formed on a negative portion of the cap assembly.

Preferably, the safety member is inserted into and welded on the electrolyte injection hole.

Alternatively, the safety member is disposed on the electrolyte injection hole and is welded on the negative portion.

Preferably, the safety member is made of a material selected from the group consisting of aluminum, nickel, stainless steel, and nickel gilding steel plate.

Preferably, the safety member is designed to be broken by battery of about 10 to 30 kgf/cm$^2$.

Alternatively, the safety member is provided with a plurality of grooves.

BRIEF DESCRIPTION OF DRAWINGS

The present invention will become more fully understood from the detailed description given hereinbelow and the accompanying drawings which are given by way of illustration only, and thus are not limitative of present invention and wherein.

BEST MODE FOR CARRYING OUT THE INVENTION

Figure 1:
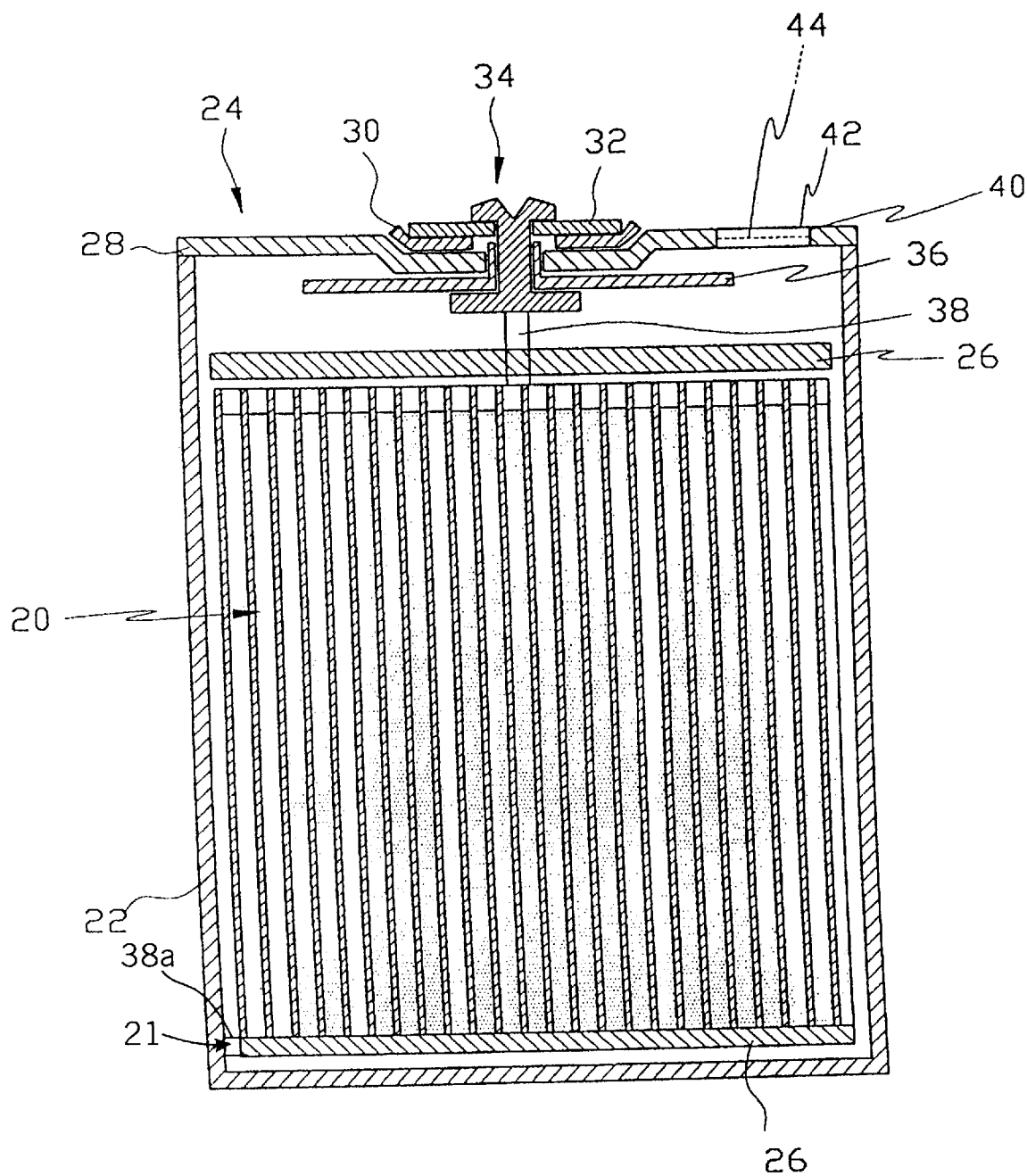
FIG. 1 is a cross sectional view illustrating a secondary battery where a cap assembly according to a preferred embodiment of the present invention is employed.

The following is the description of the preferred embodiments according to the present invention. In the drawing, like reference numerals have been used to identify like elements in each figure.

Figure 2:
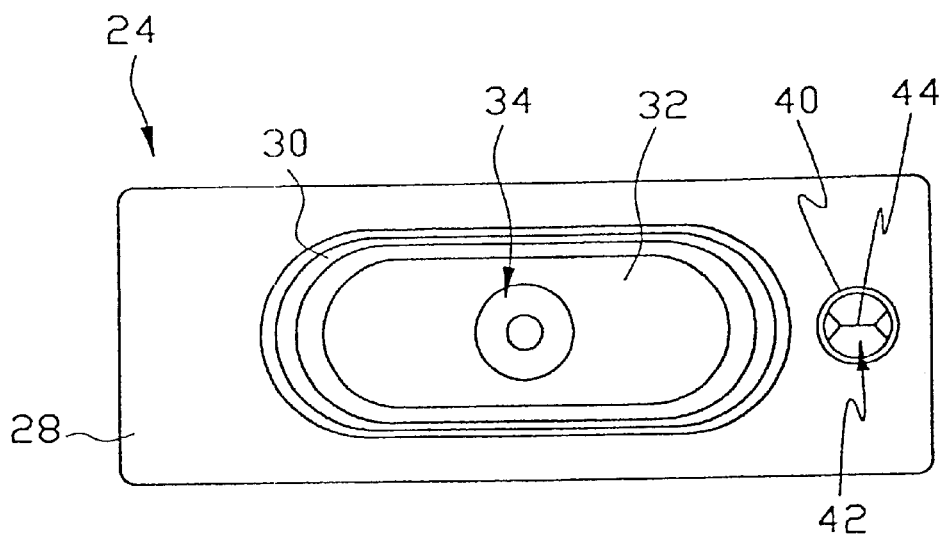
FIG. 2 is a plane view illustrating a cap assembly of a secondary battery according to a preferred embodiment of the present invention.
Figure 3:
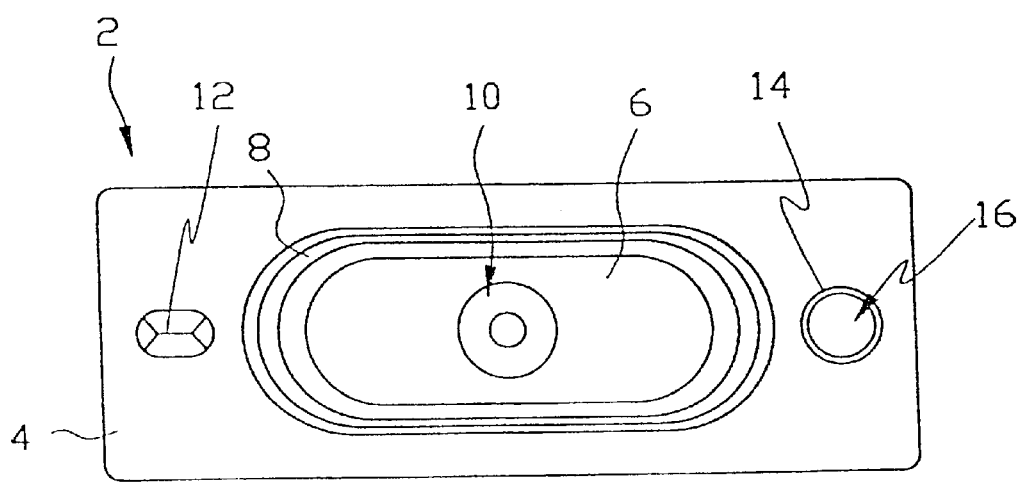
FIG. 3 is a plane view illustrating a conventional cap assembly of a secondary battery.
Figure 4:
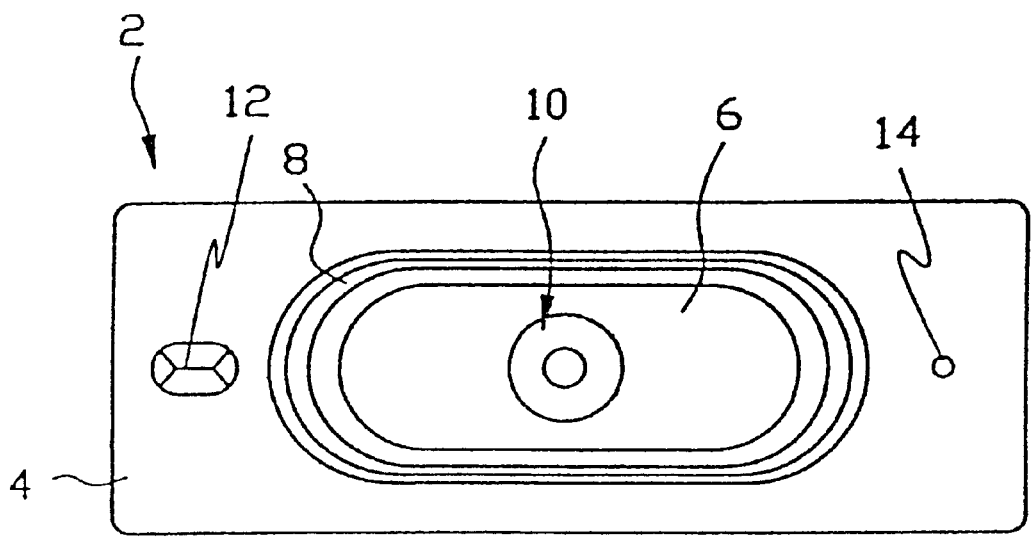
FIG. 4 is a plane view illustrating another conventional cap assembly of a secondary battery.

Referring first to FIGS. 1 and 2, there are respectively shown a sectional view of a secondary battery where a cap assembly 24 according to the present invention is employed and a plane view of the cap assembly 24.

The cap assembly 24 of the present invention is coupled on an upper end of a can 22 in which a roll electrode assembly 20 consisting of a positive electrode, a negative electrode, and a separator, and electrolyte are received. The can 22 contacts the negative electrode 21 by a tap 38a.

Insulating plates 26 are provided at upper and lower ends of the electrode assembly 20 to prevent the electrode assembly 20 from contacting the cap assembly 24 and the can 22.

The cap assembly 24 comprises a negative portion 28 which is welded to the upper end of the can 22, a positive portion 32 formed on a central portion of the negative portion 28, and a rivet 34 mounted penetrating a central portion of the negative portion 28 and positive portion 32. An insulating member 30 is disposed between the negative portion 28 and positive portion 32. The rivet 34 is used as coupling means for coupling the positive portion 32 with the negative portion 28. An insulating member 36 is disposed between the rivet 34 and the negative portion 28. The rivet 34 is connected to the positive electrode of the electrode assembly through a tap 38. That is, the rivet is used as a terminal for connecting the positive electrode to the positive portion 32. An electrolyte injection hole 40 is formed on the negative portion 28 to inject electrolyte into the can.

Figure 1A:
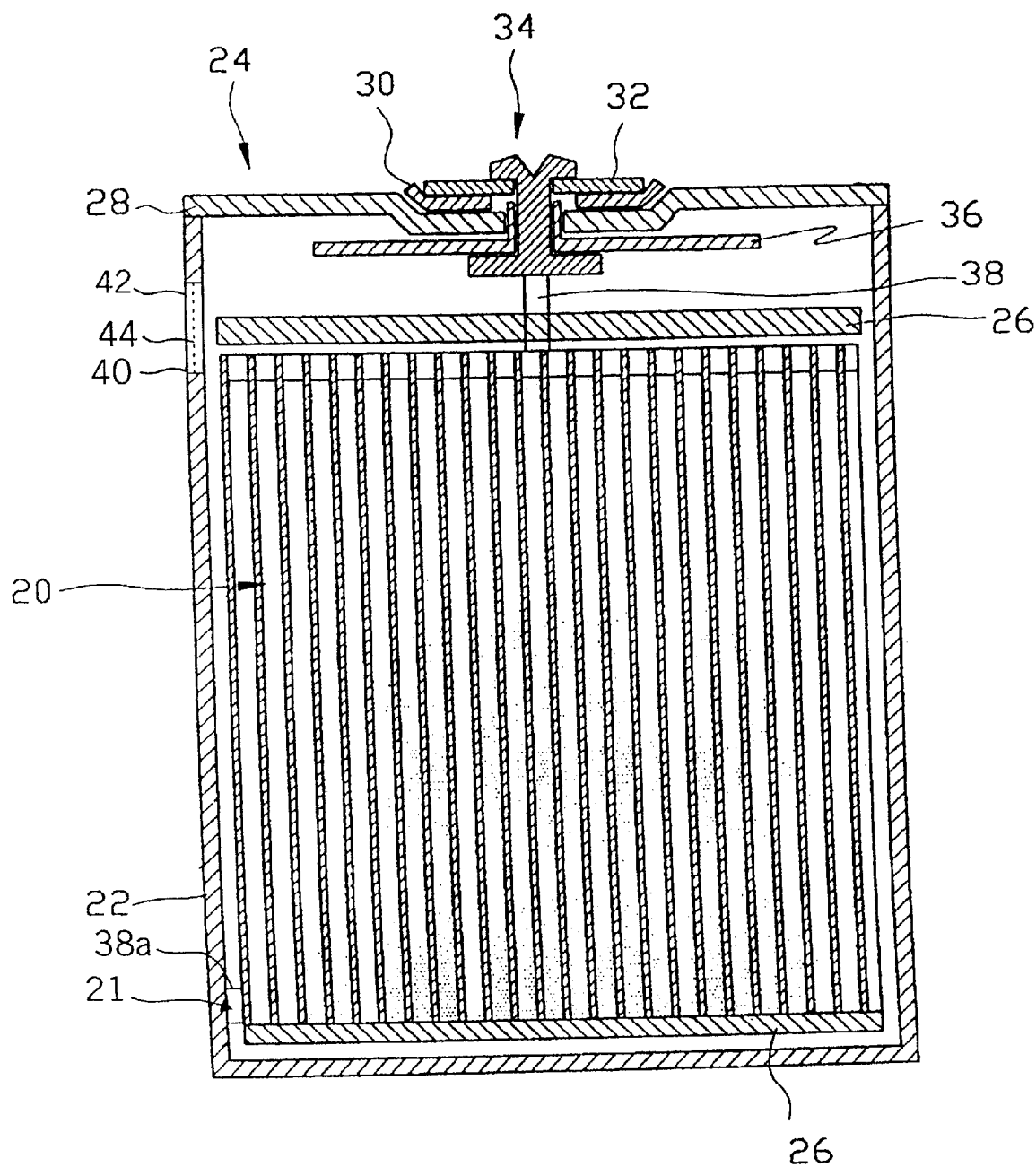
FIG. 1A is a cross sectional view illustrating a secondary battery where a cap assembly according to another preferred embodiment of the present invention is employed.

Although, in this embodiment, an electolyte injection hole 40 is formed on the negative portion 28, the location of the electrolyte injection hole 40 is not limited to this structure but can be formed on the can 22, as illustrated in FIG. 1A.

After the electrolyte is injected into the can 22, the injection hole 40 is tightly closed by a safety plate 42. In this embodiment, the safety plate 42 may be formed having the same size as that of the injection hole and inserted into and welded on the injection hole 40.

Alternatively, the safety plate 42 may be formed having the larger size as that of the injection hole 40 and is positioned to cover the injection hole 40. The safety plate 42 positioned on the injection hole 40 is welded on the negative portion 28.

The safety plate 42 is for preventing the explosion of the battery. That is, The safety plate 42 is formed having the thickness or rigidity less than that of the negative portion 28.

Alternatively, in the case where the safety plate 42 is made in the same material as the negative portion 28, safety grooves 44 are formed on the safety plate 42 through a mechanical process, etching or electroforming process. The safety plate 42 is broken open when the internal pressure of the battery is increased above a predetermined level, thereby preventing the battery from exploding.

More in detail, the safety plate 42 may be made of a material selected from the group consisting of aluminum, nickel, stainless steel, and nickel gilding steel plate.

Preferably, the safety plane 42 is designed to be broken by the internal pressure of about 10 to 30 kgf/cm$^2$.

Therefore, when the internal pressure of the battery is increased above a predetermined level by gas generated when the battery is charged and discharged, the safety plate 42 is removed or cracked, thereby enabling gas from the battery to be exhausted to reduce the internal pressure.

While this invention has been described in connection with what is presently considered to be the most practical and preferred embodiments, it is to understood that the invention is not limited to the disclosed embodiment, but, on the contrary is intended to cover various modifications and equivalent arrangements and methods included within the spirit and scope of the appended claims.

What is claimed is:

1. A secondary battery, comprising:
   a can;
   a cap assembly on an end of the can;
   an electrolyte injection hole formed on the can; and
   a safety member to close the electrolyte injection hole, the safety member for reducing an internal pressure in the can once the internal pressure exceeds a predetermined level.

2. The secondary battery of claim 1, further comprised of the can being coupled to a negative electrode of an electrode assembly for the secondary battery.

3. The secondary battery of claim 1, further comprised of the safety member being inserted into and welded on the electrolyte injection hole.

4. The secondary battery of claim 1, further comprised of the safety member being disposed on the electrolyte injection hole and being welded on the can, the can being coupled to a negative electrode of an electrode assembly for the secondary battery.

5. A secondary battery, comprising:
   a can;
   a cap assembly on an end of the can;
   an electrolyte injection hole formed on the can; and
   a safety member to close the electrolyte injection hole, the safety member being made of a material selected from the group consisting of aluminum, nickel, stainless steel, and nickel gilding steel plate.

6. A secondary battery, comprising:
   a can;
   a cap assembly on an end of the can;
   an electolyte injection hole formed on the can; and
   a safety member to close the electrolyte injection hole, the safety member being designed to be broken by battery pressure of about 10 to 30 kgf/cm$^2$.

7. A secondary battery, comprising:
   a can;
   a cap assembly on an end of the can;
   an electrolyte injection hole formed on the can; and
   a safety member to close the electrolyte injection hole, the safety member being provided with a plurality of grooves.

8. The secondary battery of claim 7, further comprised of the safety member being inserted into and welded on the electrolyte injection hole.

9. The secondary battery of claim 7, further comprised of the safety member being disposed on the electrolyte injection hole and being welded on the can, the can being coupled to a negative electrode of an electrode assembly for the secondary battery.

10. The secondary battery of claim 7, further comprised of the safety member being made of a material selected from the group consisting of aluminum, nickel, stainless steel and nickel gilding steel plate.

11. The secondary battery of claim 7, further comprised of the safety member being designed to be broken by battery pressure of about 10 to 30 kgf/cm$^2$.

* * * * *